United States Patent

[11] 3,582,118

[72] Inventors Patrick J. Hogan
 Mount Clemens;
 Thomas R. Strang, Jr., Detroit, both of, Mich.
[21] Appl. No. 14,136
[22] Filed Feb. 25, 1970
[45] Patented June 1, 1971
[73] Assignee The Budd Company
 Philadelphia, Pa.

[54] SECURING CLAMP
 4 Claims, 2 Drawing Figs.
[52] U.S. Cl. .................................................... 287/125, 16/19
[51] Int. Cl. .................................................... F16b 7/18
[50] Field of Search ........................................... 287/125, 117, 60, 61, 62; 151/29, 44; 248/188.4; 16/19

[56] References Cited
UNITED STATES PATENTS

| 1,096,564 | 5/1914 | Sandiford | 151/29 |
| 1,300,617 | 4/1919 | Izzo | 151/29 |
| 1,808,299 | 6/1931 | Edwards | 287/125 |
| 2,398,160 | 4/1946 | Silver | 287/60 |
| 2,845,288 | 7/1958 | Cierpik, Jr. | 287/60 |
| 3,356,327 | 12/1967 | Schreyer et al. | 248/188.8X |

FOREIGN PATENTS

| 962,929 | 7/1964 | Great Britain | 248/188.4 |

Primary Examiner—David J. Williamowsky
Assistant Examiner—Andrew V. Kundrat
Attorneys—Thomas I. Davenport, Edward M. Farrell, John B. Sowell, Alford L. Trueax, Jr. and William R. Nolte ABSTRACT: An easily removable clamp for securing both sides of a threaded connection to prevent relative rotation of one threaded part to the other.

PATENTED JUN 1 1971  3,582,118

INVENTORS
PATRICK J. HOGAN
THOMAS R. STRANG, JR.
BY
ATTORNEY

SECURING CLAMP

This invention relates to a holding fixture and more particularly to a securing clamp for holding both members of a threaded connection from relative rotation.

In operating machinery, there are often conditions such as impact and vibration that cause one part of a threaded connection to rotate relative to the other part and thus alter the assembled relations of the threaded parts. Where the threaded parts are to be held tightly against each other, lock washers and the like are used. When the threaded members are not held tightly against each other, the chance of relative movement due to vibration is much greater and other means must be used to prevent relative rotation.

It is an object of this invention to provide a securing clamp to prevent relative rotation at threadably engaged threaded members during the operation of their associated machinery.

Another object of this invention is to provide an inexpensive, easily attached and detached securing clamp for threaded connections.

These and other objects of this invention will become apparent as reference is made to the following specification and drawings wherein.

Figure 1:
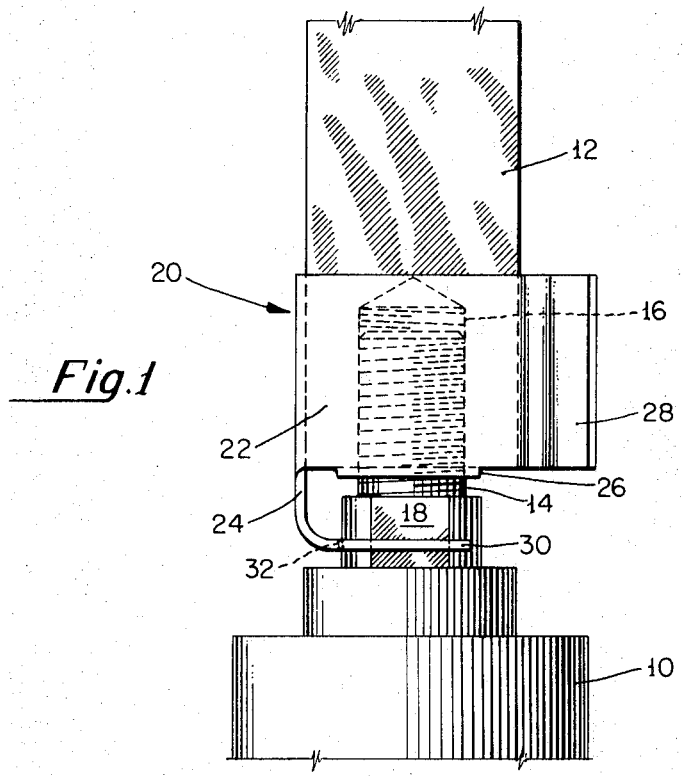
FIG. 1 is a side view of a threaded connection with a securing clamp mounted thereon to prevent relative rotation of the joined parts.
Figure 2:
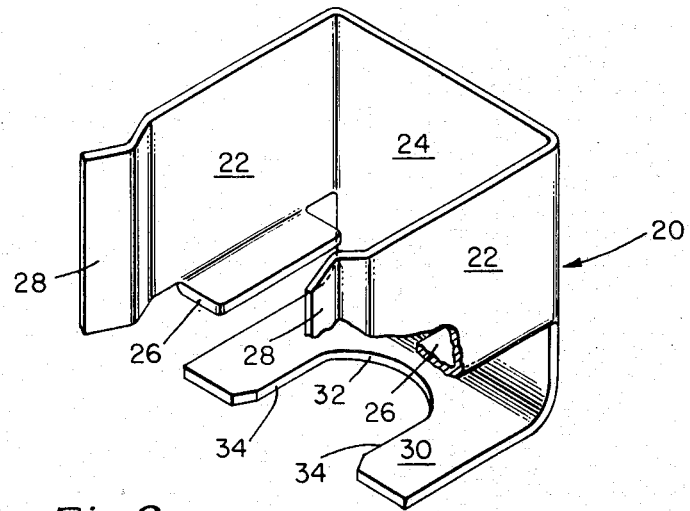
FIG. 2 is a perspective view of a securing clamp, with a portion broken away.

Referring now to the drawings, as seen in FIG. 1, a generally cylindrical piston 10 is threadably connected to a drive link 12 along the longitudinal axis of the two members. The threaded portion of the piston threadably engages the threads 16 in the rectangular link 12 to provide a connection and means for longitudinally adjusting the effective combined length of the link 12 and piston 10. A pair of diametrically opposed plane surfaces or flats 18 are provided on the piston 10 adjacent the threaded portion 14 for securing the piston while making the threaded connection or adjusting the effective length of the link 12 and piston 10.

The securing clamp 20 may be formed from a single stamping and then bent to the desired shape. In the illustrated securing clamp, a pair of substantially parallel rectangular resilient spring arms 22 are connected by a central web section 24 which extends along one edge of each arm. Each arm 22 has a foot portion 26 extending at a right angle from the plane of the arm towards the opposite arm for contacting the end of link 12 and restricting longitudinal movement of the clamp toward the link and a securing finger 28 extending along the edge opposite the web section edge. A web foot 30 extends substantially at a right angle from the web section 24 and parallel to and spaced from the foot portions 26. The web foot 30 has a slot 32 formed therein having a pair of parallel sides 34 for engaging the flats 18 of the piston 10 and restricting longitudinal movement of the clamp 20 toward the piston 10.

In operation, the link 12 and piston 10 are joined by threadably connection portion 14 into the threads 16 until the desired link-piston length is achieved. Then the securing clamp 20 is snapped over the link 12 until the finger 28 holds the clamp on the link with the foot portions 26 engaging the end of the link 12 adjacent the piston. The parallel edges 34 of the slot 32 engage and hold the flats 18, thus the slot 32 prevents rotation of the piston 10 and the web 24 and arms 22 prevent rotation of the link 12.

While but one embodiment of this invention is shown, various modifications may be derived without departing from the scope of the following claims.

We claim:

1. A securing clamp for preventing relative movement between a pair of joined members about a central axis, said securing clamp includes a first holding means for resiliently attaching said securing clamp to one of said members, a second holding means engaging the other of said members, rigid means having a web section extending along one side of said clamp for holding said first and second means in relative position to each other for maintaining said members in the same relative position; said first holding means having a pair of resilient arms extending from opposite sides of said web section for engaging one of said members, a securing finger extending from the outer ends of each arm for holding said one member between said arms, a foot portion extending substantially at a right angle from each of said arms toward the opposite arm for engaging said one member and preventing movement in one direction of said securing clamp longitudinally of said one member.

2. The securing clamp as claimed in claim 1 wherein said second holding means includes a web foot extending substantially at a right angle from the plane of said web section, said web foot including a slot formed therein having substantially parallel sides for engaging the other of said members, and said other member having means formed thereon for cooperating with said slot for restricting relative movement of said other member relative to said clamp.

3. The securing clamp as claimed in claim 2 wherein the other of said members includes a second means for cooperating with said web foot for restricting longitudinal movement of said securing clamp opposite to said one direction restricted by said foot portion.

4. In a longitudinally extensible coupling having a first member and a second member, a securing clamp for holding said members from relative movement and permitting movement in unison, said securing clamp comprising a rigid web section extending longitudinally adjacent the extensible connection, a first holding means extending from said web section for engaging said first member, said first holding means including a pair of substantially parallel resilient arms extending from opposite edges of said web section for engaging opposed sides of said first member, securing fingers extending from the end of each arm on opposite sides of said web section for securing said securing clamp in engagement with said first member for preventing rotative movement of said first member about its longitudinal axis relative to said securing clamp, and foot portions extending substantially at right angles from each of said arms toward the opposite arm for contacting an end surface of said first member and restricting movement of said securing clamp in one direction longitudinally of said members; a second holding means extending from said web section for engaging said second member, said second holding means including a web foot extending substantially normal to the plane of said web section and to the longitudinal axis of said extensible coupling for engaging said second member and restricting movement of said securing clamp in the other direction longitudinally of said members, said web foot including a slot formed therein having substantially parallel sides for engaging said second member, said second member having flats formed thereon for cooperating with said parallel sides of said slot for preventing rotational movement of said second member about its longitudinal axis relative to said securing clamp.